US009321667B2

(12) United States Patent
Caldwell

(10) Patent No.: US 9,321,667 B2
(45) Date of Patent: Apr. 26, 2016

(54) SYSTEM AND METHOD FOR AERATION

(71) Applicant: Airmaster Aerator L.L.C., Wisner, LA (US)

(72) Inventor: Dean A. Caldwell, DeRidder, LA (US)

(73) Assignee: Airmaster Aerator L.L.C., Wisner, LA (US)

( * ) Notice: Subject to any disclaimer, the term of this patent is extended or adjusted under 35 U.S.C. 154(b) by 290 days.

(21) Appl. No.: 13/769,061

(22) Filed: Feb. 15, 2013

(65) Prior Publication Data
US 2014/0076820 A1 Mar. 20, 2014

Related U.S. Application Data

(60) Provisional application No. 61/701,224, filed on Sep. 14, 2012.

(51) Int. Cl.
*C02F 7/00* (2006.01)
*C02F 3/24* (2006.01)
*C02F 3/16* (2006.01)

(52) U.S. Cl.
CPC ... *C02F 7/00* (2013.01); *C02F 3/24* (2013.01); *C02F 3/16* (2013.01); *Y02W 10/15* (2015.05)

(58) Field of Classification Search
CPC .............................. Y02W 10/15; B01D 19/02

USPC ..................................... 210/115, 170.01, 153
See application file for complete search history.

(56) References Cited

U.S. PATENT DOCUMENTS

| 4,733,972 A * | 3/1988 | Weis | B01D 19/02 366/136 |
| 5,510,022 A * | 4/1996 | Mullis | 210/170.06 |
| 2004/0226896 A1 * | 11/2004 | Lovestead et al. | 210/776 |

* cited by examiner

Primary Examiner — Duane Smith
Assistant Examiner — Adam W Bergfelder

(57) ABSTRACT

An aeration device includes a foam suppression system. The aeration device raises the level of oxygen and air in a body of substantially liquid fluid, such as an aerating-oxidizing pond, lagoon, basin, or reservoir. The aeration system is buoyant and floats on top of the body of fluid. The foam suppression system includes a submersible grinder pump coupled to a sprinkler head by a fluid conduction system. The submersible grinder pump draws in a fluid from beneath a surface of a body of fluid and pumps it through the fluid conduction system and out of the sprinkler head. The sprinkler head sprays the fluid drawn from beneath the fluid surface far outward onto an area surrounding the aeration device with surface foam. The falling water or fluid sprayed from the sprinkler head quashes the surface foam. The sprinkler head is disposed in a location on the aeration device suitable to suppress the surface foam.

20 Claims, 5 Drawing Sheets

SYSTEM AND METHOD FOR AERATION

CROSS-REFERENCE TO RELATED APPLICATION(S) AND CLAIM OF PRIORITY

The present application claims priority under 35 U.S.C. §119(e) to the subject matter of U.S. Provisional Patent Application Ser. No. 61/701,224 entitled "SYSTEM AND METHOD FOR AERATION," filed Sep. 14, 2012. The content of the above identified patent document is incorporated herein by reference.

TECHNICAL FIELD

The present disclosure generally relates to aeration of fluids and more particularly to a system and method for foam suppression in an aeration system.

BACKGROUND OF THE DISCLOSURE

Bodies of water, such as ponds, basins, reservoirs, and lagoons are used to treat waste. Aerobic and anaerobic activities of certain bacteria is one way of treating waste. However, the byproducts of certain anaerobic bacteria give off unpleasant odors. Aerobic bacteria produce carbon dioxide as a byproduct, which does not produce such noxious odors. At times, the oxygen content of the water is insufficient to support the bacterial activity. Aeration increases the amount of oxygen in the wastewater. Certain methods of aeration produce bubbles at the surface of the aerated body of water.

SUMMARY OF THE DISCLOSURE

To address one or more of the above-deficiencies of the prior art, various disclosed embodiments described in this disclosure provide an improved apparatus for and method of aerating ponds, lagoons, basins, and/or reservoirs. This apparatus is configured to be used in water treatment, wastewater treatment, industrial applications, aquaculture, and agricultural applications. This apparatus is configured to raise the dissolved oxygen level of the water, and to achieve high capacity water movement, foam suppression, evaporation, and cooling.

An apparatus configured to aerate a body of substantially liquid fluid and to suppress a surface foam of the body of fluid is provided. The apparatus includes a fluid aeration system. The apparatus also includes a foam suppression system. The foam suppression system includes a submersible pump configured to draw in a fluid from beneath a surface of a body of fluid. The apparatus includes a sprinkler head in fluid communication with the submersible pump. The sprinkler head is configured to eject at least a portion of the drawn fluid onto a portion of the surface of the body of fluid. When the portion of the surface of the body of fluid comprises a surface foam, the portion of the fluid ejected from the sprinkler head suppresses the surface foam.

A system for suppressing a surface foam of a body of fluid is provided. The system includes a submersible pump configured to draw in a fluid from beneath a surface of a body of fluid. The system includes a sprinkler head in fluid communication with the submersible pump. The sprinkler head is configured to eject at least a portion of the drawn fluid onto a portion of the surface of the body of fluid. When the portion of the surface of the body of fluid comprises surface foam, the portion of the fluid ejected from the sprinkler head suppresses the surface foam.

A method for aerating a body of substantially liquid fluid and suppressing surface foam of the body of fluid is provided. The method includes aerating a body of fluid. The method includes drawing in a fluid from beneath a surface of the body of fluid. The method also includes ejecting at least a portion of the drawn fluid onto a portion of the surface of the body of fluid. The method includes suppressing the surface foam when the portion of the surface of the body of fluid comprises surface foam.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller might be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, described below, and the various embodiments used to describe the principles of the present disclosure are by way of illustration only and should not be construed in any way to limit the scope of the disclosure. The drawings are not necessarily drawn to scale. The numerous innovative teachings of the present application will be described with reference to exemplary non-limiting embodiments. It should be understood at the outset that, although example embodiments are illustrated below, the present invention may be implemented using any number of techniques, whether currently known or not. The present invention should in no way be limited to the example implementations, drawings, and techniques illustrated below.

Figure 1:
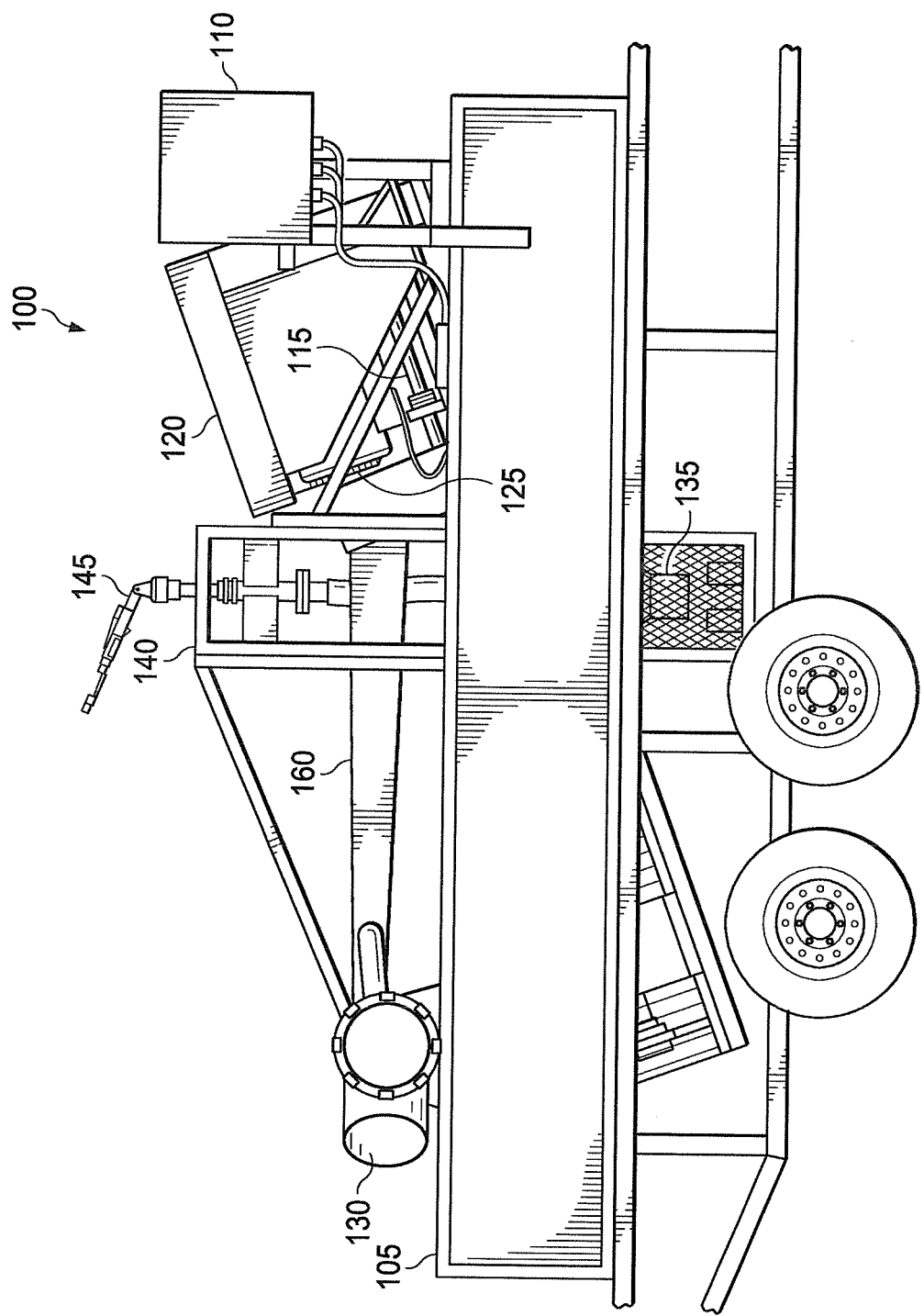
FIG. 1 illustrates an aeration system according to embodiments of the present disclosure.

FIG. 1 illustrates an aeration system 100 according to embodiments of the present disclosure. The aeration system 100 is configured to provide aeration to a body of fluid, such as a body of water. Examples of bodies of water include ponds, lagoons, basins, reservoirs, and the like. Aeration of the water body can create surface foam. The resulting surface foam can span several feet wide and deep. Although certain details will be provided with reference to the components of the aeration system 100, it should be understood that other embodiments may include more, less, or different components. The aeration system 100 includes one or more floats 105, a motor 110, a pump shaft 115, a turbo blower 120 at a first end of the aeration system; a pump 125, a discharge pressure manifold 130 at a second end of the aeration system. The aeration system 100 includes a foam suppression system. The foam suppression system 100 includes a submersible pump 135, a spray tower 140, and sprinkler head 145 mounted in the middle of the spray tower. The aeration system 100 includes a frame 150 that provides structural support and stability for the aeration system 100 and the components of the aeration system and secures non-submersible components above the surface of the body of fluid. The frame 150 includes a one or a combination of support beams, support plates, trusses, and mounting supports.

In certain embodiments, the aeration system 100 includes two floats 105 (or pontoons), one along the length of opposite sides of the aeration system 100. The floats are configured to maintain the non-submersible components of the aerator system 100 above the surface of the body of water. The floats 105 comprise an expanded polystyrene core with a hybrid urethane coating. The coating of the float is impervious to diluted acids, alkalis and petroleum products. In certain embodiments, each float 105 is sheltered by a shell 165, such as a 304-L stainless steel expanded metal shell. In certain embodiments, a support beam holds the floats together. The shell 165 can support the weight of at least two 240 pound service technicians, while the aeration system remains afloat. In certain embodiments, the length of the shell substantially extends the length of the aeration system.

The motor 110 drives the pump shaft 115. A toothed, drive system powers the single pump shaft 115 that drives the turbo blower 120 and the impeller. Water is drawn from below the surface into an impeller. The water drawn in is fed into the discharge pressure manifold 130. In certain embodiments, the drive system does not include a gearbox.

In certain embodiments, a motor hood covers the motor 110. The motor hood is composed of 304-L stainless steel. The motor hood covers the motor, the drive belt, and maintenance-free pillow-block bearings. The motor hood is hinged to protect the motor 110 from direct exposure to the sun, precipitation, and water spray.

The turbo blower 120 injects air into the wastewater stream. A pipe assembly 160 carries the oxygenated air mix from the turbo blower 120 to the discharge pressure manifold 130. The air permeates the wastewater and forcibly discharges the wastewater out of the exits of the discharge pressure manifold 130. In certain embodiments, the diameter of the pipe assembly 160 is between two and three inches.

The discharge pressure manifold 130 includes a large discharge pipe. The discharge pipe includes a center portion extending approximately the outer width between the floats 105. The discharge pipe includes two end portions, each end portion extending out from an end of the center portion. The diameter of the center portion is larger than the diameter of the diameter of the end portions. For example, in certain embodiments, the center portion of the discharge pipe includes a diameter that ranges from 10 to 16 inches, and the reduced diameter end portions of the discharge pipe includes a diameter that ranges from 6-10 inches. A top portion of the discharge pressure manifold 130 includes perforations that spray out a portion of the water, such as a one-third portion of the water within the discharge pressure manifold 130. In certain embodiments, the center portion of the discharge pipe includes the top perforations and the end portions do not include top perforations. In certain embodiments, the discharge pipe comprises 305-L stainless steel. In certain embodiments, the exits of the discharge pipe include vanes to induce a vortex. The vortex creates negative pressure zones. The negative pressure zones increase the amount of air that can be injected. The high-pressure of the spraying removes dissolved gases, volatile organic compounds (VOCs), and ammonia.

The combination of the impeller action, the top discharge, and the side discharges creates large circular mixing areas. The mixing area raises the dissolved oxygen level over very large oxygen-deficient areas. The spray controls foam pulled toward the intake and assists with cooling and aeration.

Figure 2:
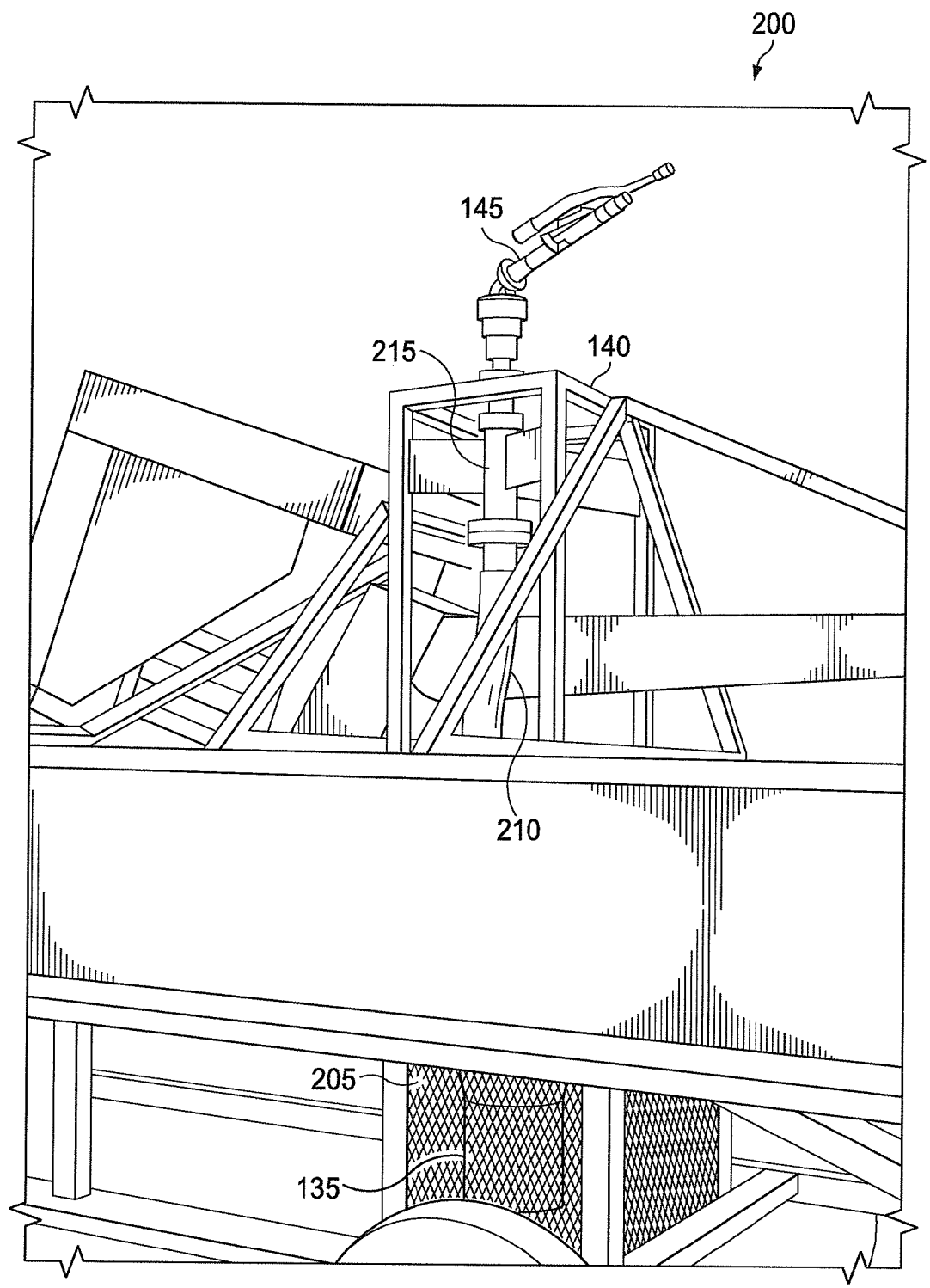
FIG. 2 illustrates a filtration and foam suppression system according to embodiments of the present disclosure.

FIG. 2 illustrates a foam suppression system 200 according to embodiments of the present disclosure. The foam suppression system 200 is configured to suppress a build-up of foam. In certain embodiments, foam suppression system 200 is also configured to filter large objects and particles from a body of fluid. For example, a filtration and foam suppression system 200 is configured to quash foam, which may result at or near the surface of a body of water from aeration activities, using water filtered of large objects and particles. Although certain details will be provided with reference to the components of the foam suppression system 200, it should be understood that other embodiments may include more, less, or different components. The foam suppression system 200 includes the submersible pump 135 in fluid communication with a sprinkler head 145. In certain embodiments, a fluid conductor assembly transports the fluid from the output of the submersible pump 135 to the input of the sprinkler head 145. The fluid conductor assembly includes a flexible hose 210 and pipe 215.

In certain embodiments, a filtration system 205 is disposed around the submersible pump 135. For example, the filtration system 205 may surround the submersible pump 135. The filtration system 205 includes one or more of the following: a grating, a cage, a pipe filter, and or another suitable filter material. The filtration system 205 blocks, removes or otherwise inhibits a passage of large objects or particles from flowing into the submersible pump 135.

The submersible pump 135 draws fluid up from beneath the surface of the body of water. The output of submersible pump 135 releases the drawn fluid into an inlet of the first end of the fluid conductor assembly. In certain embodiments, the submersible pump 135 includes a grinder pump, or other suitable waste management pump. When waste objects or particles flow through the filtration system 205, the grinder pump is configured to grind those waste objects or particles into a fine slurry. The grinder pump prevents clogging of the fluid path including the flexible hose 210 and the pipe 215.

The fluid conductor assembly includes a first end coupled to the output of the submersible pump 135, and a second end coupled to the input of the sprinkler head 145. The fluid conductor assembly provides a fluid path that puts the sprinkler head 145 in fluid communication with submersible pump 135. The path of the fluid within the fluid conductor assembly begins at the first end of the fluid conductor assembly. For example, the first end of the fluid conductor assembly includes an inlet (or first open end) of the flexible hose 210. The fluid flows through flexible hose 210, through the second end of the flexible hose 210. The second end of the flexible hose 210 is coupled to a first end of the pipe 215. The fluid exits the flexible hose 215 and enters the bottom end of the pipe 215. The fluid flows through the pipe 215, through the top end of the pipe 215. The top end of the pipe 215 is coupled to the input of the sprinkler head 145. The fluid exits the fluid conductor assembly at the top end of the pipe 215 and enters the input of the sprinkler head 145. In certain embodiments, the flexible hose 210 comprises flexible stainless steel hosing. In certain embodiments, the pipe 215 comprises stainless steel piping.

The sprinkler head 145 ejects the fluid outward onto an area surrounding the aeration system 100. The spraying or sprinkling of the fluid onto the area surrounding the aeration system 100 causes a suppression of foam from forming around the aeration system 100. The sprinkler head 145 includes any device configured to dispense water over a 100 feet radius or further. The sprinkler head 145 rotates to spray the water at various angles. In certain embodiments, the sprinkler head 145 rotates continuously to spray 360 degrees. In certain embodiments, the sprinkler head 145 completes each revolution at a speed of 360 degrees per 1.3 minutes. In certain embodiments, the sprinkler head 145 rotates repeatedly to spray fewer than 360 degrees. The sprinkler head 145 is disposed above the discharge pressure manifold 130. In certain embodiments, the sprinkler head ejects the water from height above the height of the motor (including the motor hood). The sprinkler head 145 is mounted in the middle of a spray tower 140.

The spray tower 140 provides structural support for the sprinkler head. In certain embodiments, the spray tower 140 includes a plurality of support plates welded to the pipe 215. The support plates secure the pipe 215 in the middle of the spray tower 140, such as in the center of the spray tower. The spray tower is coupled to the support beams and trusses of the frame 150, and the coupling secures the spray tower 145 between the floats 105.

Figure 3:
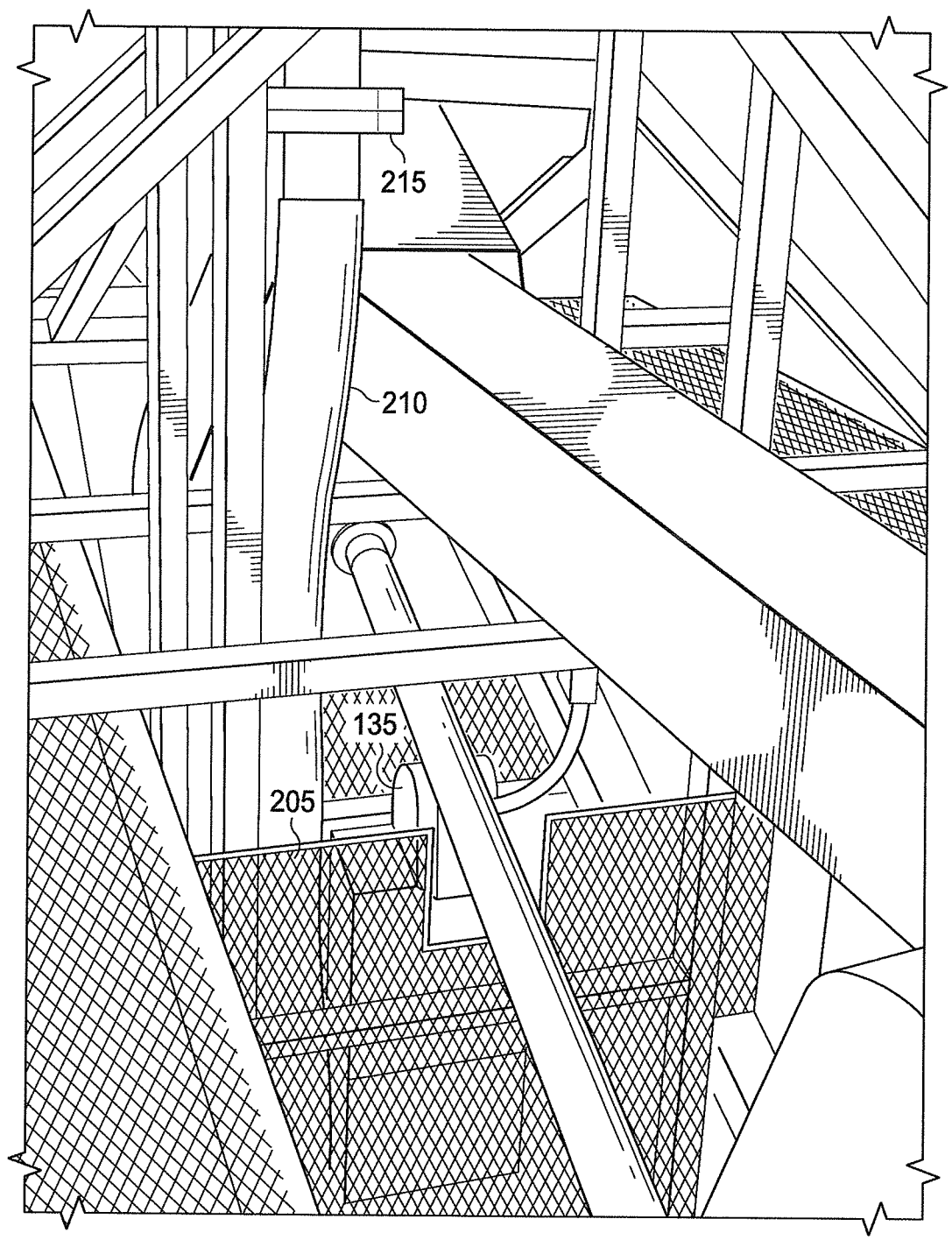
FIGS. 3 and 4 illustrate alternative views of the filtration and foam suppression system according to embodiments of the present disclosure.
Figure 4:
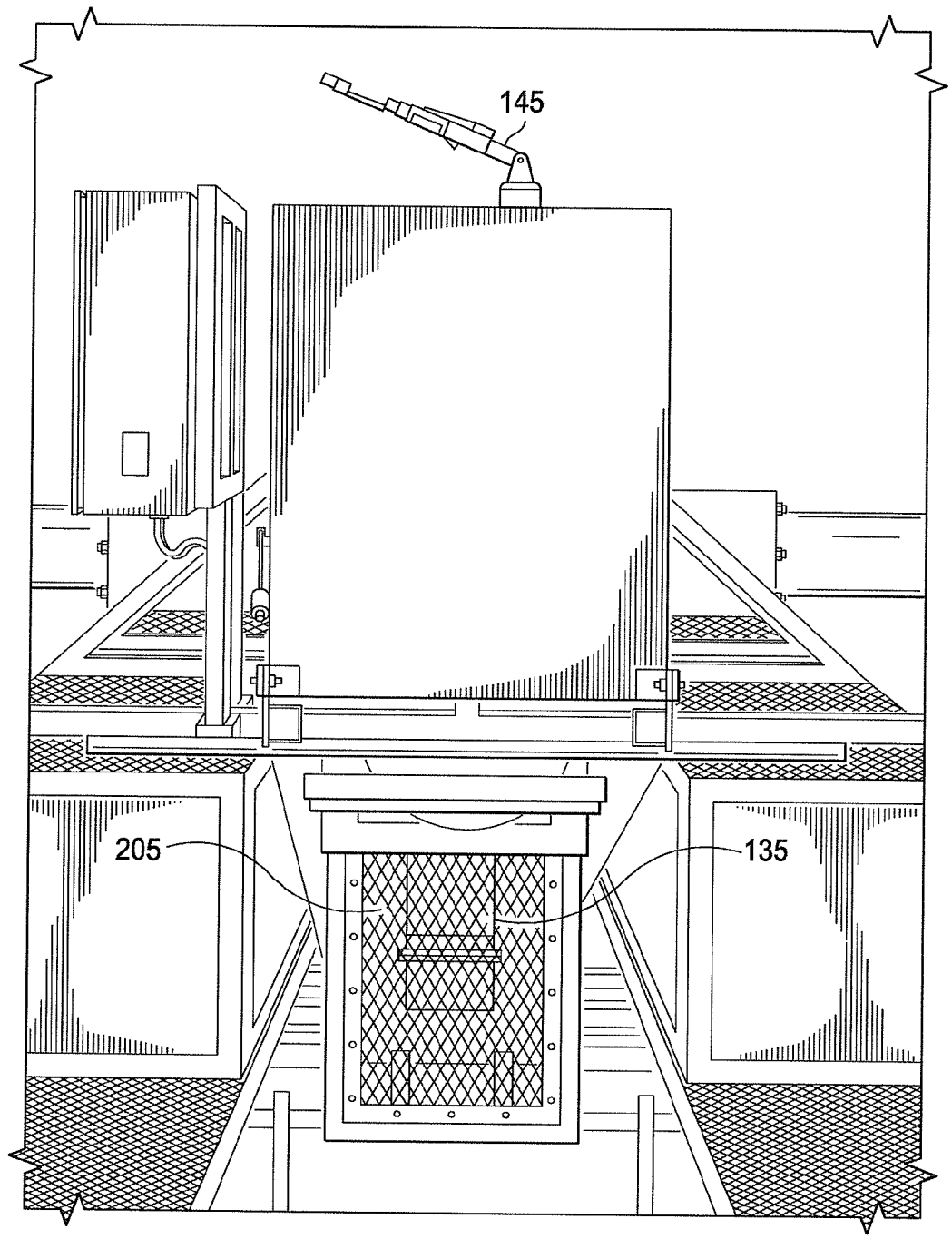

FIGS. 3 and 4 illustrate alternate views of the filtration and foam suppression system 200 according to embodiments of the present disclosure. Although certain details will be provided with reference to the components of the aeration system 100 and filtration and foam suppression system 200 of FIGS. 3 and 4, it should be understood that other embodiments may include more, less, or different components.

Figure 5:
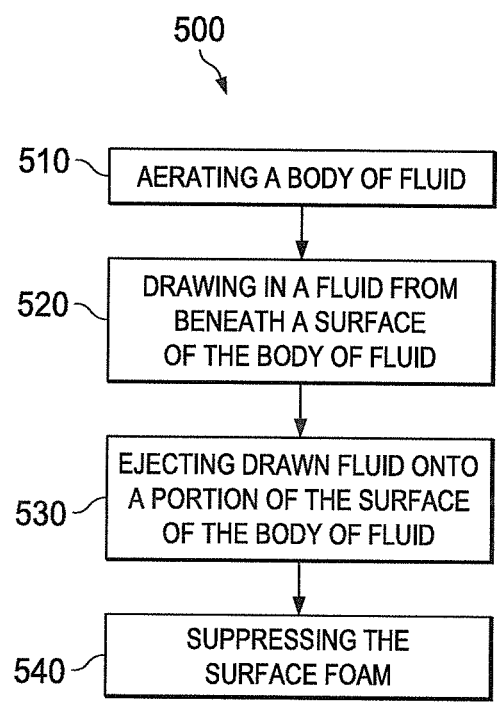
FIG. 5 illustrates a method of aerating and suppressing foam of a body of fluid according to embodiments of the present disclosure.

FIG. 5 illustrates method 500 of aerating and suppressing foam of a body of fluid according to embodiments of the present disclosure. An aeration device (i.e., an apparatus including an aeration system) or a foam suppression system perform the method 500. The method 500 includes aerating a body of fluid in block 510. The method 500 includes drawing in a fluid from beneath a surface of the body of fluid in block 520. In block 530, the method 500 includes ejecting at least a portion of the drawn fluid onto a portion of the surface of the body of fluid. The method 500 includes suppressing the surface foam when the portion of the surface of the body of fluid comprises surface foam in block 540.

Although various features have been shown in the figures and described above, various changes may be made to the figures. For example, the size, shape, arrangement, and layout of components shown in FIGS. 1 through 4 are for illustration only. Each component could have any suitable size, shape, and dimensions, and multiple components could have any suitable arrangement and layout. Also, various components in FIGS. 1 through 4 could be combined, further subdivided, or omitted and additional components could be added according to particular needs. Further, each component in a device or system could be implemented using any suitable structure(s) for performing the described function(s). In addition, while FIG. 5 illustrates various series of steps that could overlap, occur in parallel, occur multiple times, or occur in a different order.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A system comprising:
   a floatation support configured to maintain non-submersible components of the system above a surface of a body of fluid;
   a fluid aeration system comprising:
       a turbo blower configured to inject air into a water stream, and
       a discharge pressure manifold coupled to the turbo blower and configured to forcibly discharge the air-injected water stream into the body of fluid; and
   a foam suppression system comprising:
       a submersible pump configured to draw in a fluid from beneath the surface of the body of fluid; and
       a sprinkler head in fluid communication with the submersible pump, the sprinkler head configured to eject at least a portion of the drawn fluid onto a portion of the surface of the body of fluid,
       the foam suppression system configured to couple to the fluid aeration system,
   wherein when the portion of the surface of the body of fluid comprises a surface foam created by the fluid aeration system, the sprinkler head is configured to direct a portion of the fluid ejected from the sprinkler head to suppress the surface foam.

2. The system of claim 1, further comprising:
   a grating, cage or filter material disposed around the submersible pump, the grating, cage or filter material configured to inhibit objects and particles from being drawn into the submersible pump;
   wherein the submersible pump is configured to draw the fluid through the grating, cage or filter material.

3. The system of claim 2, wherein:
   the submersible pump comprises a grinder pump.

4. The system of claim 1, further comprising:
   a tower, wherein a portion of the tower is disposed above the surface of the body of fluid;
   wherein the sprinkler head is mounted to the portion of the tower disposed above the surface of the body of fluid.

5. The system of claim 1, wherein the sprinkler head is configured to at least one of:
   rotate and spray fluid at multiple angles, and
   spray fluid to distance of at least 100 feet diameter.

6. The system of claim 1, further comprising:
a fluid conductor assembly comprising a first end coupled to the submersible pump and a second end coupled to the sprinkler head, the fluid conductor assembly configured to receive the drawn fluid through an inlet of the first end and to release the drawn fluid through an outlet of the second end to the sprinkler head.

7. The system of claim 6, wherein:
the fluid conductor assembly comprises at least one of a flexible hose and a pipe.

8. An apparatus comprising:
a fluid aeration system comprising:
- a turbo blower configured to inject air into a water stream, and
- a discharge pressure manifold coupled to the turbo blower and configured to forcibly discharge the air-injected water stream into a body of fluid; and a foam suppression system comprising:
- a submersible pump configured to draw in a fluid from beneath a surface of the body of fluid;
- a sprinkler head in fluid communication with the submersible pump, the sprinkler head configured to eject at least a portion of the drawn fluid onto a portion of the surface of the body of fluid,
- wherein when the portion of the surface of the body of fluid comprises a surface foam, the portion of the fluid ejected from the sprinkler head suppresses the surface foam.

9. The apparatus of claim 8, further comprising:
a grating, cage or filter material disposed around the submersible pump, the grating, cage or filter material configured to inhibit objects and particles from being drawn into the submersible pump;
wherein the submersible pump is configured to draw the fluid through the grating, cage or filter material.

10. The apparatus of claim 9, wherein:
the submersible pump comprises a grinder pump.

11. The apparatus of claim 8, further comprising:
a tower, wherein a portion of the tower is disposed above the surface of the body of fluid;
wherein the sprinkler head is mounted to the portion of the tower disposed above the surface of the body of fluid.

12. The apparatus of claim 8, wherein the sprinkler head is configured to at least one of:
rotate and spray fluid at multiple angles, and
spray fluid to distance of at least 100 feet diameter.

13. The apparatus of claim 8, further comprising:
a fluid conductor assembly comprising a first end coupled to the submersible pump and a second end coupled to the sprinkler head, the fluid conductor assembly configured to receive the drawn fluid through an inlet of the first end and to release the drawn fluid through an outlet of the second end to the sprinkler head.

14. The apparatus of claim 13, wherein:
the fluid conductor assembly comprises at least one of a flexible hose and a pipe.

15. A method comprising:
aerating, by a fluid aeration system, a water stream by:
injecting air, by a turbo blower, into the water stream;
forcibly discharging, by a pressure manifold coupled to the turbo blower, the air-injected water stream into a body of fluid;
suppressing, by a foam suppression system, a surface foam by:
drawing in, by a submersible pump, a fluid from beneath a surface of the body of fluid; and
when a portion of the surface of the body of fluid comprises the surface foam, suppressing the surface foam by ejecting, by a sprinkler head in fluid communication with the submersible pump, at least a portion of the drawn fluid onto the portion of the surface of the body of fluid.

16. The method of claim 15, wherein drawing in the fluid further comprises:
filtering objects and particles from being drawn into the submersible pump,
wherein the submersible pump is configured to draw the fluid through a grating, cage or filter material.

17. The method of claim 16, wherein:
the submersible pump comprises a grinder pump.

18. The method of claim 15, wherein
the sprinkler head is mounted to a portion of a tower disposed above the surface of the body of fluid.

19. The method of claim 15, wherein the sprinkler head is configured to at least one of:
rotate and spray fluid at multiple angles, or
spray fluid to distance of at least 100 feet diameter.

20. The method of claim 16, further comprising:
receiving the drawn fluid through an inlet of a first end of a fluid conductor assembly coupled to the submersible pump; and
releasing the drawn fluid through an outlet of a second end of the fluid conductor assembly,
wherein the fluid conductor assembly comprises at least one of a flexible hose or a pipe.

* * * * *